United States Patent [19]

Czermak et al.

[11] Patent Number: 5,439,504
[45] Date of Patent: Aug. 8, 1995

[54] DIRECT-REDUCTION PROCESS FOR DIRECTLY REDUCING PARTICULATE IRON-OXIDE-CONTAINING MATERIAL

[75] Inventors: Karl Czermak, Enns; Konstantin Milionis, Stiefling; Johannes L. Schenk, Linz; Siegfried Zeller, Leonding, all of Austria

[73] Assignees: Voest-Alpine Industrieanlagenbau GmbH, Austria; Brifer International Ltd., Bridgetown, Barbados; part interest to each

[21] Appl. No.: 336,390

[22] Filed: Nov. 9, 1994

Related U.S. Application Data

[63] Continuation of Ser. No. 61,306, May 13, 1993, abandoned.

[30] Foreign Application Priority Data

May 22, 1992 [AT] Austria .................... 1066/92

[51] Int. Cl.⁶ ............................................ C22B 5/14
[52] U.S. Cl. ........................ 75/444; 75/450; 266/156; 266/172
[58] Field of Search ............. 75/444, 450; 266/156, 266/172

[56] References Cited

U.S. PATENT DOCUMENTS

| | | | |
|---|---|---|---|
| 2,752,234 | 6/1956 | Shipley | 75/450 |
| 3,193,378 | 7/1965 | Peet . | |
| 5,082,251 | 1/1992 | Whipp | 266/142 |

FOREIGN PATENT DOCUMENTS 2911692 11/1980 Germany .

*Primary Examiner*—Melvyn Andrews
*Attorney, Agent, or Firm*—Hopgood, Calimafde, Kalil & Judlowe

[57] ABSTRACT

In a process for the direct reduction of particulate iron-oxide-containing material by the fluidized bed method, reformed gas is mixed with top gas forming in the direct reduction of the iron-oxide-containing material and is fed to a fluidized-bed reduction zone as a reducing gas. To lower the energy demand and utilizing the potential of the reducing gas, both the top gas and the reformed gas are subjected to $CO_2$ scrubbing and the reducing gas formed by mixing top gas with reformed gas is adjusted to an $H_2$ content ranging between 45 and 75%, preferably between 50 and 65%, and to a CO content ranging between 10 and 20%.

13 Claims, 1 Drawing Sheet

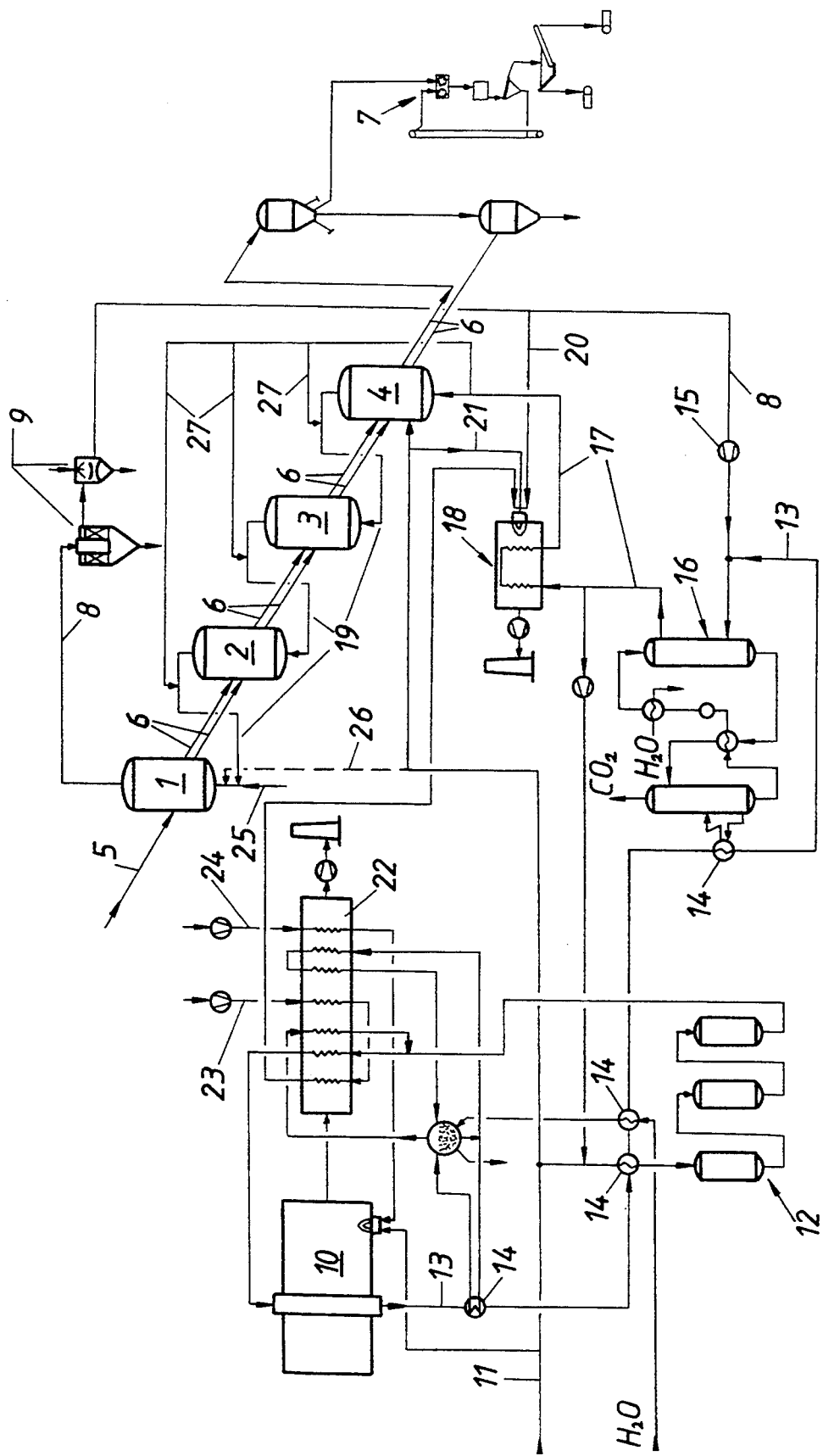

DIRECT-REDUCTION PROCESS FOR DIRECTLY REDUCING PARTICULATE IRON-OXIDE-CONTAINING MATERIAL

This is a continuation of application Ser. No. 08/061,306 filed May 13, 1993, now abandoned.

The invention relates to a process for the direct reduction of particulate iron-oxide-containing material by the fluidized bed method, wherein reformed gas is mixed with top gas forming in the direct reduction of the iron-oxide-containing material and is fed to a fluidized-bed reduction zone as a reducing gas, as well as a plant for carrying out the process.

A process of this type is known from U.S. Pat. No. 5,082,251. There, fine ore rich in iron is reduced by aid of a reducing gas under elevated pressure in an assembly of fluidized-bed reactors arranged in series. Subsequently, the thus produced iron powder is subjected to hot or cold briquetting.

The reducing gas is produced by catalytic reformation of desulphurized and preheated natural gas by means of overheated water vapor in a conventional reformer furnace. The reformed gas is then cooled to about 425° C. in a heat exchanger. After this, the $H_2$ portion in the reducing gas is increased by CO conversion by aid of an iron oxide catalyst according to the following equation:

$$H_2O + CO = CO_2 + H_2$$

After this, the $CO_2$ forming, as well as that coming from the reformer, is removed in a $CO_2$ scrubber such that the reducing gas is composed of more than 90% $H_2$, a very low portion of CO as well as $CO_2$, $H_2O$, $N_2$ and $CH_4$.

This gas is mixed with the reducing gas that is consumed only partially (top gas), is heated to 850° C. and reduces the fines in three stages (three reactors) in counterflow.

The flow of the ore starts with drying and subsequent screening. Then, the ore gets into a preheating reactor in which natural gas is burnt. In three consecutively arranged reactors, the fines are reduced under elevated pressure.

With this process, the reducing gas has a very high portion of $H_2$ such that the reduction of the fines exclusively is effected via the reaction:

$$Fe_2O_3 + 3H_2 = 2Fe + 3H_2O - \Delta H,$$

which is strongly endothermic.

This strongly endothermic reaction would involve a substantial decrease of the temperature prevailing in the reactors. In order to prevent this, with the known process one is forced to increase the specific reducing gas amount per ton of sponge iron to considerably above the thermodynamically required minimum amount of gas such that the reaction temperature in the last reactor lies above 700° C.

The invention aims at avoiding these disadvantages and difficulties and has as its object to apply the chemical potential of the reducing gas to lowering the energy demand. The set object, in particular, is to considerably reduce, for instance, by more than 30%, the operational costs, in particular, the energy costs involved.

In accordance with the invention, this object is achieved in that both the top gas and the reformed gas are subjected to $CO_2$ scrubbing and that the reducing gas formed by mixing top gas with reformed gas is control to an $H_2$ content ranging between 45 and 75%, preferably between 50 and 65%, and to a CO content ranging between 10 and 20%.

According to the invention, the reduction of the fine ore not exclusively is effected via the strongly endothermic reaction with $H_2$ described as part of the prior art, but additionally via the reaction $$Fe_2O_3 + 3CO = 2Fe + 3CO_2 + \Delta H,$$

which is exothermic. The $CO_2$ forming does not constitute a drawback, since it is scrubbed in a $CO_2$ scrubber through which the top gas is passed. The reaction of CO with $H_2$ according to the equation $$CO + 3H_2 = CH_4 + H_2O$$

is not disadvantageous to the process according to the invention, since methane is formed at a very low concentration only, thus having no negative effects.

Furthermore, it is essential that the CO content is upwardly limited by 20%. If the CO content were above this value, complications in the plant could occur; the tubes conducting this gas might become destroyed.

Due to the $CO_2$ scrubbing of the top gas commonly with the reformed gas provided by the present invention, the CO content can be optimized in a simple manner, i.e., with a view to effecting a reaction with CO, thus rendering feasible the neutralization of the energy balance (as compared to the reaction with $H_2$, which is endothermic), yet reliably preventing the destruction of the gas conducting tubes.

From DE-A-25 26 737, a process according to the preamble is known, with which, however, methane is introduced into the reactor vessel together with oxygen. The production of reducing gas takes place only in the interior of the reactor, into which top gas having been subjected to $CO_2$ scrubbing is supplied via a separate duct.. The CO content ranges between 31.6% in the first reaction stage and 18.3% in the last reaction stage. On an average, it thus lies far above the maximum range claimed.

According to a preferred embodiment of the invention, the adjustment of the $H_2$ and CO contents in the reducing gas is effected by the mode of operation of a reformer, a reduced vapor/natural gas ratio, preferably ranging between 2.5 and 3.5, being observed as compared to conventional reformer operation modes. In this manner, it is possible to keep the temperature in the reduction zone substantially constant.

Preferably, the reducing gas is control to a $CH_4$ content ranging between 8 and 35%.

To minimize the energy demand, direct reduction, according to a preferred embodiment, is carried out in several fluidized-bed reduction zones consecutively arranged in series, the reducing gas being conducted from one reduction zone to another in counterflow to the particulate iron-oxide-containing material and subjected to partial combustion by oxygen feeding at least in the fluidized bed reduction zone being the last for the reducing gas.

In order to adjust an approximately equally high constant temperature in all of the fluidized-bed reduction zones, freshly formed reducing gas, advantageously, additionally is directly supplied partially to the individual fluidized-bed reduction zones following the first fluidized bed reduction zone, seen in the flow direction of the reducing gas, preferably at an amount of from 5 to 15%.

According to a preferred variant, the direct reduction of iron-oxide-containing material is carried out in several fluidized bed reduction zones consecutively arranged in series, wherein, in the first fluidized-bed for this material, exclusively reducing gas recycled from the consecutively arranged fluidized-bed reduction zones is used for preheating the iron-oxide-containing material. In doing so, merely the sensible heat of the offgases from the consecutively arranged reactors is utilized, without burning any gas. Such preheating may be effected in one or several steps.

A plant for carrying out the process according to the invention, comprising at least one fluidized bed reactor to receive the iron-oxide-containing material, a reducing-gas feed line leading to this fluidized bed reactor, and a top-gas discharge line discharging from the fluidized bed reactor the top gas forming in the reduction process, a reformer, a reformed-gas line departing from the reformer and uniting with the top-gas discharge line, the reducing gas formed of the reformed gas and of the top gas entering the fluidized bed reactor through the reducing-gas feed duct, as well as a $CO_2$ scrubber, is characterized in that both the reformed gas line and the top-gas discharge line run into the $CO_2$ scrubber and the reducing-gas feed line leads from the $CO_2$ scrubber to the fluidized bed reactor.

According to a preferred embodiment, further minimization of the energy demand may be attained in that a plurality of fluidized bed reactors are consecutively arranged in series, wherein the iron-oxide-containing material is conducted from one fluidized bed reactor to another via conveyor ducts in one direction and the reducing gas is conducted from one fluidized bed reactor to another via connection lines in the opposite direction, and wherein, in addition to the duct feeding the reducing gas emerging from the previously arranged fluidized bed reactor, an oxygen feed line and, if desired, a natural-gas feed line run at least into the fluidized bed reactor arranged last in the reducing gas flow direction.

Keeping the temperatures in all of the fluidized bed reactors constantly at equal levels, according to another embodiment is achieved in that a plurality of fluidized bed reactors are consecutively arranged in series, wherein the iron-oxide-containing material is conducted from one fluidized bed reactor to another via conveyor ducts in one direction and the reducing gas is conducted from one fluidized bed reactor to another via connection lines; in the opposite direction, and wherein the fluidized bed reactors, in addition to being arranged in series, are arranged in parallel relative to an additional reducing-gas feed line in terms of reducing gas feeding.

BRIEF DESCRIPTION OF THE DRAWINGS

The accompanying drawing is a flowsheet comprising four fluidized bed reactors series-connected and through which iron oxide-containing material is passed for reduction to metallic iron.

In the following, the invention will be explained in more detail by way of the drawing, which illustrates a process diagram according to a preferred embodiment.

The plant according to the invention comprises four fluidized bed reactors 1 to 4 consecutively arranged in series, wherein iron-oxide-containing material, such as fine ore, is conducted to the first fluidized bed reactor 1 through an ore supply duct 5 and from one fluidized bed reactor to another through conveyor ducts 6, and the completely reduced material (sponge iron) is hot or cold briquetted in a briquetting assembly 7. If required, the reduced iron is protected against reoxidation during briquetting by an inert gas system (not illustrated).

Prior to introducing the fine ore into the first fluidized bed reactor, it is subjected to ore preparation, such as drying and screening, which is not illustrated in detail.

Reducing gas is conducted from the fluidized bed reactor 4 to fluidized bed reactors 3 to 1 in counterflow to the ore flow and is discharged from the fluidized bed reactor 1 arranged last in the gas flow direction as a top gas via a top-gas discharge line 8 and cooled and washed in a wet scrubber 9. The production of the reducing gas is effected by reforming natural gas fed through line 11 and desulphurized in a desulphurizing assembly 12, in a reformer 10. The reformed gas formed of natural gas and vapor (i.e., water vapor as steam) essentially consists of $H_2$, $CO$, $CH_4$, $H_2O$ and $CO_2$. This reformed gas is fed to several heat exchangers 14 via a reformed-gas line 13 and there is cooled to ambient temperature, thus condensing water out of the gas. The reformed gas line 13 enters the top-gas discharge line 8 after the top gas has been compressed by means of a compressor 15. The mixed gas thus forming is passed through a $CO_2$ scrubber 16 and is freed of $CO_2$, then being available as a reducing gas. This reducing gas is heated to a reducing gas temperature of about 800° C. in a gas heater 18 downstream of the $CO_2$ scrubber 16 via a reducing-gas feed line 17 and is fed to the fluidized bed reactor 4 that is arranged first in the gas flow direction, where it reacts with the fine ores to produce directly reduced iron. The fluidized bed reactors 4 to 1 are connected in series; the reducing gas gets from one fluidized bed reactor to another via connection lines 19.

Part of the top gas is transferred out of the gas circulation 8, 17, 19 in order to avoid accumulation of inert gases, such as $N_2$. The outwardly transferred top gas is fed to the gas heater 18 via a branch line 20 to heat the reducing gas and is burnt there. Possibly lacking energy is supplemented by natural gas fed through line 21.

The sensible heat of the reformed gas leaving the reformer 10 as well as of the smoke gases derived from the reformer is utilized in a recuperator 22 to preheat the natural gas after having passed the desulphurizing assembly 12, to generate the vapor required for reformation and to preheat the combustion air fed to the gas heater 18 via line 23 and, if desired, also the reducing gas. The combustion air fed to the reformer through line 24 is preheated as well.

In order to avoid a temperature decrease in the first fluidized bed reactor 1, seen in the flow direction of the ore, it may be advantageous to burn part of the reducing gas leaving the second fluidized bed reactor 2 in the first fluidized bed reactor, for which purpose an oxygen feed duct 25 and, if desired, a natural-gas feed duct 26 run into the first fluidized bed reactor.

In order to keep the reaction temperature constant at equal levels in all of the fluidized bed reactors 1 to 4, thereby obtaining further reduction of the energy demand, hot and fresh reducing gas, via branch lines 27, is directly fed to the fluidized bed reactors 1 to 3 following the first fluidized bed reactor 4 in the flow direction of the reducing gas, at an amount of about 10% per fluidized bed reactor 1, 2 and 3. The fluidized bed reactors 1 to 4, thus, not only are connected in series in respect of reducing gas feeding, but also are connected in parallel as regards the supply of a slight portion of the reducing as. By contrast, the fluidized bed reactors 1 to 4 are exclusively connected in series in the embodiment illustrated as far as the discharge and conveyance of reducing gas is concerned.

By using four fluidized bed reactors 1 to 4 for realizing direct reduction (by avoiding a preheating reactor), a further reduction of the energy demand and the minimization of dust losses are feasible as compared to the prior art.

EXAMPLE

In a plant corresponding to that depicted in the drawing and having an hourly output of 70 t/h of hot-briquetted iron, 100 t/h of fine ore, 12,200 Nm$^3$/h of natural gas were reacted with 43,300 Nm$^3$/h of vapor, i.e., steam, to form 76,600 Nm$^3$/h of reformed gas. The reforming temperature was 830° C., the pressure was 18.5 bar. The amount of natural gas required for heating the reformer was 6,200 Nm$^3$/h.

The analysis of the respective gases and of the fine ore was as follows:

|  | Natural gas [%] | Reformed gas [%] | Fine ore [%] |
|---|---|---|---|
| $CH_4$ | 83.4 | 2.30 | $Fe_2O_3$ 93.94 |
| $C_nH_m$ | 8.6 | — | Gangue: 1.84 |
| $CO_2$ | 8.0 | 10.70 | Balance: LOI |
| CO | — | 12.90 |  |
| $H_2$ | — | 68.90 |  |
| $O_2$ | — | — |  |
| $N_2$ | — | 2.00 |  |
| $H_2S$ | 20 ppm | — |  |
| $H_2O$ | — | 3.20 |  |

The cold reformed gas, 50,000 Nm$^3$/h, was mixed with 145,000 Nm$^3$/h of recycled top gas and conducted into $CO_2$ scrubbing, where it was freed from $CO_2$. The gas, 182,000 Nm$^3$/h, had the following analysis:

|  | [%] | Preferred ranges [%] min. max. |
|---|---|---|
| $CH_4$ | 16.29 | 8.00–35.00 |
| $CO_2$ | 0.10 | 0.10–3.50 |
| CO | 9.23 | 8.00–35.00 |
| $H_2$ | 57.92 | 45.00–75.00 |
| $H_2O$ | 1.52 | 1.50–5.00 |
| $N_2$ | 14.94 | 5.00–35.00 |

This gas was preheated to 800° C. in a gas heater. To this end, approximately 5,500 Nm$^3$/h of top gas and 4,600 Nm$^3$/h of natural gas were consumed.

The top gas had the following analysis:

|  | [%] |
|---|---|
| $CH_4$ | 17.00 |
| $CO_2$ | 4.40 |
| CO | 4.90 |
| $H_2$ | 39.90 |
| $H_2O$ | 18.90 |
| $N_2$ | 14.90 |

The hot-briquetted iron had a degree of metallization ($Fe_{met}/Fe_{tot}$) of 92%.

What we claimed is:

1. In a direct reduction process for reducing particulate iron oxide-containing material in a fluidized bed wherein a reducing gas is employed derived from natural gas following reforming thereof and thereby provide reformed natural gas, said reformed natural gas comprising $H_2$, CO, $CH_4$, $H_2O$, $CO_2$ and $N_2$, which reformed gas is mixed with recycle top gas formed during the reduction of the iron oxide contained in said material, the improvement which comprises:

scrubbing said top gas to form a scrubbed top gas,
   compressing said scrubbed top gas to form a compressed top gas,
   mixing said reformed natural gas with said compressed top gas to form a reducing gas mixture thereof containing $CO_2$,
   subjecting said gas mixture to $CO_2$ scrubbing and thereby provide a reducing gas for said iron oxide-containing material,
   heating said reducing gas to an elevated temperature to provide a heated reducing gas mixture sufficient to reduce said iron-oxide-containing material to metallic iron,
   causing a stream of said heated reducing gas mixture to flow through serially arranged fluid bed reduction zones to reduce said iron oxide to metallic iron and provide a partially consumed reducing gas as top gas,
   recycling said partially consumed reducing gas as top gas to heat said iron oxide-containing material prior to the mixing thereof with said reformed natural gas to form a reducing gas mixture; and
   circulating said reducing gas mixture through said serially arranged fluid bed reduction zones and thereby reduce said contained iron oxide to metallic iron, whereby a substantial saving in energy costs is obtained.

2. An improved process as set forth in claim 1, wherein said reducing gas mixture is controlled in composition over the range of about 8 to 35% $CH_4$, about 0.1 to 3.5% $CO_2$, about 8 to 35% CO, about 45 to 75% $H_2$, about 1.5 to 5% $H_2O$ as steam and about 5 to 35% nitrogen.

3. An improved process as set forth in claim 2, wherein the $H_2$ content of said reducing gas mixture is controlled over a range of about 50% to 65%.

4. An improved process as set forth in claim 2, wherein the CO content of the reducing gas mixture ranges from about 10 to 20%.

5. An improved process as set forth in claim 2 wherein the reducing steam/natural gas composition is provided at a ratio of about 2.5 to 3.5.

6. An improved process as set forth in claim 2, wherein said direct reduction process is carried out in several fluidized-bed reduction zones consecutively arranged in series, the reducing gas being conducted from one reduction zone to another in counterflow to said particulate iron-oxide-containing material and subjected to partial combustion by oxygen feeding at least in the fluidized bed reduction zone being the last for the reducing gas.

7. An improved process as set forth in claim 6, further comprising
   forming fresh reducing gas and
   additionally directly supplying said fresh reducing gas partially to each of said fluidized-bed reduction zones following the first one of said fluidized-bed reduction zone in the direction of flow of said reducing gas.

8. An improved process as set forth in claim 7, wherein the fresh reducing gas is supplied in an amount ranging from about 5 to 15% of the original reducing gas flowing through said serially arranged fluidized reduction zones.

9. In a plant for use in a direct reduction process of particulate iron-oxide-containing material in a fluidized bed process by means of a reducing gas, and comprising at least one fluidized bed reactor arranged to receive said iron-oxide-containing material, said plant including a reducing-gas feed line connected to said at least one fluidized bed reactor, a top-gas discharge line extending from said at least one fluidized bed reactor for conducting top gas formed in said reduction process, a reformer arranged to produce reformed gas from natural gas, reformed gas line means extending from said reformer and connected to said top-gas discharge line, reducing-gas feed duct means for feeding said reducing gas produced from said reformed gas and from said top gas into said at least one fluidized-bed reactor, and $CO_2$ scrubbing means the improvement:

wherein said top-gas discharge line is connected to and passes through a scrubbing means, wherein said top-gas line leaving said scrubbing means is connected to a compressor with the top gas line passing through and extending from said compressor, wherein said reformed-gas line means is connected to said top-gas discharge line extending from said compressor to provide a gas discharge line as a reducing gas feed line through which a mixture of said reformed gas and said top gas is conducted as the reducing gas, wherein said reducing-gas feed line is connected to a $CO_2$-scrubbing means, and wherein said reducing-gas feed line means extends from said $CO_2$ scrubbing means to said at least one fluidized bed reactor.

10. An improved plant as set forth in claim 9, wherein a plurality of fluidized bed reactors ranging from a first bed to a last bed are serially arranged, and further comprising conveyor duct means cooperatively associated with said fluidized beds arranged to conduct said iron-oxide-containing material from one fluidized bed reactor to another in one direction, and connection line means arranged to conduct said reducing gas from one of said fluidized-bed reactors to another of said fluidized-bed reactors in the opposite direction from the last bed to the first bed, and oxygen feed line means connected at least to the last fluidized bed reactor.

11. An improved plant as set forth in claim 10, further comprising a natural-gas feed duct connected at least to the last fluidized bed reactor.

12. An improved plant as set forth in claim 9, wherein a plurality of fluidized bed reactors are consecutively arranged in series, and further comprising conveyor duct means arranged to conduct said iron-oxide-containing material from one of said fluidized bed reactors to another of said fluidized-bed reactors in one direction and connection line means arranged to conduct said reducing gas from one of said fluidized-bed reactors to another of said fluidized-bed reactors in the opposite direction, and an additional reducing-gas feed line, said fluidized bed reactors, in addition to being arranged in series, being arranged in parallel relative to said additional reducing-gas feed line in terms of reducing gas feeding.

13. An improved plant as set forth in claim 12, wherein four fluidized bed reactors are consecutively arranged in series.

* * * * *

UNITED STATES PATENT AND TRADEMARK OFFICE
CERTIFICATE OF CORRECTION

PATENT NO. : 5,439,504

DATED : August 8, 1995

INVENTOR(S) : Karl Czermak et al.

It is certified that error appears in the above-identified patent and that said Letters Patent is hereby corrected as shown below:

The title page, item 75, insert :

--Roy Hubert Whipp, Jr.
Florida, U.S.A.--

Signed and Sealed this

Ninth Day of January, 1996

Attest:

BRUCE LEHMAN

Attesting Officer     Commissioner of Patents and Trademarks